United States Patent
Casper et al.

(10) Patent No.: US 10,231,373 B2
(45) Date of Patent: Mar. 19, 2019

(54) DRAWBAR APPARATUS OF AN AGRICULTURAL IMPLEMENT

(71) Applicant: Deere & Company, Moline, IL (US)

(72) Inventors: Robert T. Casper, Mingo, IA (US);
Bryan D. Blauwet, Ankeny, IA (US);
Richard J. Connell, Slater, IA (US);
Jeremy D. Krantz, Polk City, IA (US);
John M. Schweitzer, Ankeny, IA (US)

(73) Assignee: Deere & Company, Moline, IL (US)

( * ) Notice: Subject to any disclaimer, the term of this patent is extended or adjusted under 35 U.S.C. 154(b) by 141 days.

(21) Appl. No.: 15/262,846

(22) Filed: Sep. 12, 2016

(65) Prior Publication Data

US 2017/0034990 A1 Feb. 9, 2017

Related U.S. Application Data

(62) Division of application No. 13/752,465, filed on Jan. 29, 2013, now abandoned.

(51) Int. Cl.
*A01B 63/32* (2006.01)
*A01B 59/04* (2006.01)
(Continued)

(52) U.S. Cl.
CPC ................ *A01B 63/32* (2013.01); *A01B 5/04* (2013.01); *A01B 29/00* (2013.01); *A01B 59/04* (2013.01);
(Continued)

(58) Field of Classification Search
CPC ....... A01B 63/24; A01B 63/245; A01B 61/04; A01B 61/044; A01B 61/046; A01B 63/32
See application file for complete search history.

(56) References Cited

U.S. PATENT DOCUMENTS

| 4,116,140 A | * | 9/1978 | Anderson | A01O 5/068 111/136 |
| 4,418,761 A | * | 12/1983 | Dietrich, Sr. | A01B 29/00 172/271 |

(Continued)

FOREIGN PATENT DOCUMENTS

JP 2002142507 5/2002

OTHER PUBLICATIONS

European Search Report Issued in Counterpart Application No. 14152913.1, dated Jun. 20, 2014 (8 pages).

*Primary Examiner* — Matthew D. Troutman

(57) ABSTRACT

A drawbar apparatus is provided for coupling an earth-working tool to a frame of an agricultural implement. The drawbar apparatus comprises a drawbar. The drawbar comprises a first portion coupled to the frame and a second portion. A joint comprises a first bracket comprising a protrusion. The protrusion defines a first aperture. The first bracket is coupled to one of the second portion of the drawbar and the earth-working tool. A second bracket defines a channel configured to receive the protrusion. The channel defines a second aperture on a first side of the channel and a third aperture on a second side of the channel. The second bracket is coupled to the other of the second portion of the drawbar and the earth-working tool. A fastener is positioned through the first aperture, the second aperture, and the third aperture. The protrusion is configured to move laterally in the channel.

16 Claims, 8 Drawing Sheets

(51) Int. Cl.
- *A01B 5/04* (2006.01)
- *A01B 29/00* (2006.01)
- *A01B 61/04* (2006.01)
- *A01B 63/24* (2006.01)
- *A01B 15/18* (2006.01)
- *A01B 29/04* (2006.01)
- *A01B 49/02* (2006.01)

(52) U.S. Cl.
CPC .......... *A01B 61/046* (2013.01); *A01B 63/24* (2013.01); *A01B 15/18* (2013.01); *A01B 29/04* (2013.01); *A01B 49/027* (2013.01)

(56) References Cited

U.S. PATENT DOCUMENTS

| | | |
|---|---|---|
| 4,448,274 A | 5/1984 | van der Lely |
| 4,595,064 A | 6/1986 | Anderson |
| 4,648,466 A | 3/1987 | Baker et al. |
| 4,660,652 A * | 4/1987 | Moos .................. A01B 61/046 172/260.5 |
| 5,065,681 A | 11/1991 | Hadley |
| 6,068,061 A * | 5/2000 | Smith .................... A01B 13/08 172/139 |
| 6,123,292 A | 9/2000 | Ralph |
| 6,253,692 B1 | 7/2001 | Wendling et al. |
| 6,318,477 B1 | 11/2001 | Bettin |
| 6,460,623 B1 | 10/2002 | Knussman et al. |
| 7,156,186 B2 * | 1/2007 | Knobloch ............ A01B 13/025 172/540 |
| 7,766,093 B2 | 8/2010 | Becker et al. |
| 7,942,210 B2 * | 5/2011 | Ankenman ............ A01B 35/16 172/540 |
| 7,997,217 B2 | 8/2011 | Stark et al. |
| 2003/0015327 A1 | 1/2003 | Cox et al. |
| 2003/0178209 A1 | 9/2003 | Knobloch et al. |
| 2008/0066935 A1 | 3/2008 | Becker et al. |
| 2009/0065222 A1 | 3/2009 | Steinlage et al. |
| 2013/0062083 A1 | 3/2013 | Casper et al. |
| 2014/0262379 A1 * | 9/2014 | Landoll .................. A01B 33/02 172/452 |

* cited by examiner

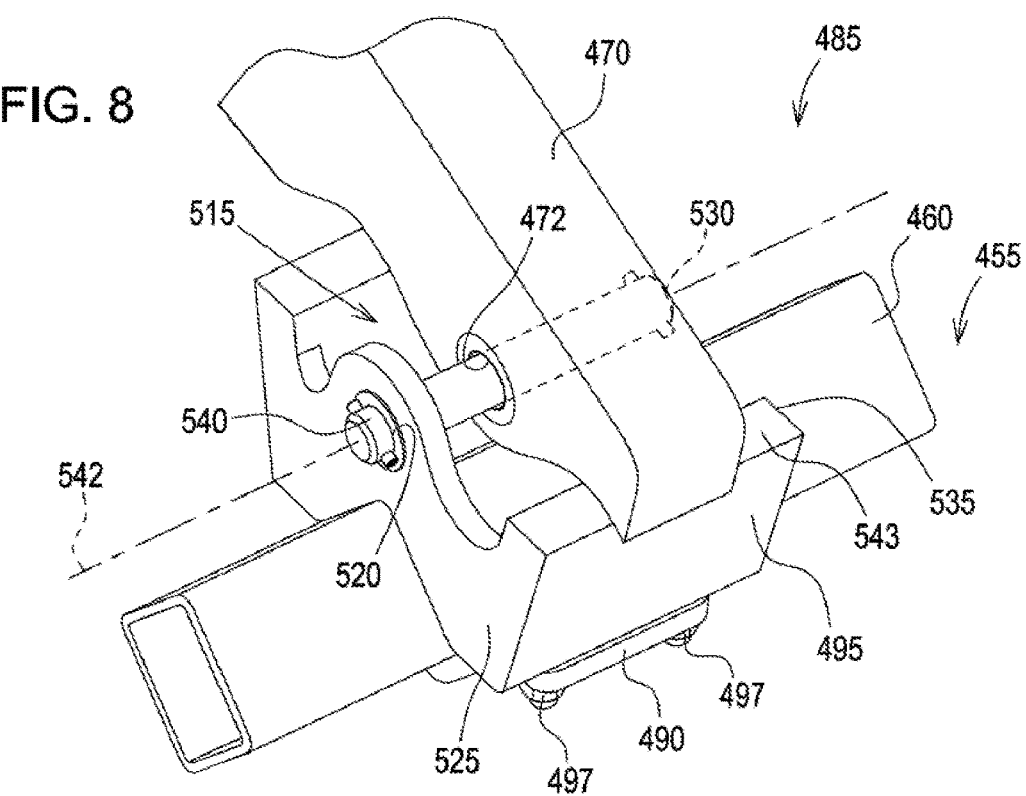
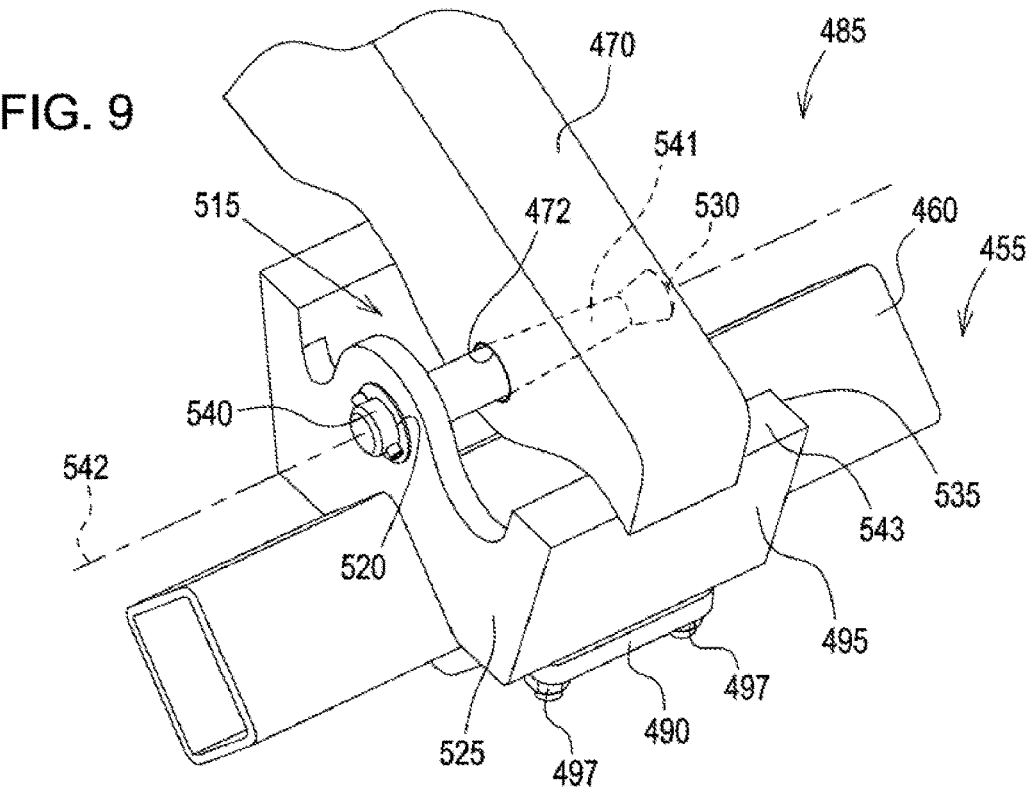

DRAWBAR APPARATUS OF AN AGRICULTURAL IMPLEMENT

CROSS-REFERENCE TO RELATED APPLICATIONS

This application is a divisional of U.S. application Ser. No. 13/752,465, filed Jan. 29, 2013.

FIELD OF THE DISCLOSURE

The present disclosure generally relates to agricultural implements for conditioning soil, and more particularly to a drawbar apparatus for supporting an earth-working tool on agricultural implements.

BACKGROUND OF THE DISCLOSURE

In order to support an earth-working tool on an agricultural implement, agricultural implements commonly include rearwardly-projecting arms. The arms are pivotally mounted to a frame of the agricultural implement and are biased downward by spring structure so that the earth-working tool is engaged with the soil. The spring structure creates a down force on the earth-working tool. Each spring structure must be adjusted separately to change the down force. The down force changes over time due to spring fatigue.

SUMMARY OF THE DISCLOSURE

In one embodiment, a drawbar apparatus for coupling an earth-working tool to a frame of an agricultural implement is disclosed. The drawbar apparatus comprises a drawbar.

The drawbar is elongated in a fore-and-aft direction and comprises a first end portion coupled to the frame and a second end portion. A joint comprises a first bracket including an upright protrusion containing a first pair of fore-and-aft spaced apertures. The first bracket is coupled to one of the second end portion of the drawbar and the earth-working tool. A second bracket defines a channel including laterally spaced, first and second sides configured to receive the protrusion between them. The first and second sides of the second bracket respectively contain a second pair of apertures and a third pair of apertures. The second bracket is coupled to the other of the second portion of the drawbar and the earth-working tool.

A pair of fasteners each include a longitudinal axis. The pair of fasteners are respectively positioned through the first pair of apertures, the second pair of apertures, and the third pair of apertures. The pair of fasteners couple the protrusion to the first bracket and the second bracket. The protrusion of the joint is configured to move laterally between the first and second sides of the channel along the longitudinal axes of the pair of fasteners.

In another embodiment, a drawbar apparatus for coupling an earth-working tool to a frame of an agricultural implement is disclosed. The drawbar apparatus comprises a first drawbar and a second drawbar, with each of the first and second drawbars being elongated in a fore-and-aft direction.

The first drawbar comprises a first end portion coupled to the frame and a second end portion. A first joint comprises a first bracket. The first bracket comprises an upright protrusion. The protrusion contains a first aperture. The first bracket is coupled to one of the second end portion of the first drawbar and the earth-working tool. A ball joint is coupled to the first aperture. A second bracket defines a channel including laterally spaced first and second sides having the protrusion received between them. The first and second sides of the second bracket respectively contain second and third apertures. The second bracket is coupled to the other of the second end portion of the first drawbar and the earth-working tool.

A fastener comprises a longitudinal axis. The fastener is positioned through the first aperture, the second aperture, and the third aperture. The fastener couples the first bracket and the second bracket.

The second drawbar is identical to the first drawbar and comprises a first end portion coupled to the frame and a second end portion. A second joint comprises a first bracket. The first bracket comprises an upright protrusion. The protrusion contains a first aperture. The first bracket is coupled to one of the second end portion of the second drawbar and the earth-working tool. A ball joint is coupled to the first aperture. A second bracket defines a channel including laterally spaced first and second sides having the protrusion received between them. The first and second sides of the second bracket respectively contain second and third apertures. The second bracket is coupled to the other of the second end portion of the second drawbar and the earth-working tool.

A fastener comprises a longitudinal axis. The fastener is positioned through the first aperture, the second aperture, and the third aperture. The fastener couples the first bracket and the second bracket. The ball joints of the first joint and the second joint are configured to enable relative pivotal movement between the first bracket and the second bracket.

In yet another embodiment, an agricultural implement is disclosed. The agricultural implement comprises a coupling mechanism for coupling to a vehicle. A frame is coupled to the coupling mechanism and extends from the coupling mechanism. The frame is adapted to be pulled by the vehicle. A plurality of wheel assemblies is coupled to the frame. The wheel assemblies support the frame above a surface.

A drawbar apparatus for coupling an earth-working tool to a frame of an agricultural implement is disclosed. The drawbar apparatus comprises a first drawbar and a second drawbar, the first and second drawbars being elongated in a fore-and-aft direction.

The first drawbar comprises a first end portion coupled to the frame and a second end portion. A first joint comprises a first bracket. The first bracket comprises an upright protrusion. The protrusion contains a first aperture. The first bracket is coupled to one of the second end portion of the first drawbar and the earth-working tool. A ball joint is coupled to the protrusion of the first bracket and located within the first aperture. A second bracket defines a channel having laterally spaced first and second sides having the protrusion received between them. The first and second sides of the channel of the second bracket respectively constrain second and third apertures. The second bracket is coupled to the other of the second end portion of the first drawbar and the earth-working tool.

A fastener comprises a longitudinal axis. The fastener is positioned through the first aperture, the second aperture, and the third aperture. The fastener couples the first bracket and the second bracket.

The second drawbar is identical to the first drawbar and comprises a first end portion coupled to the frame and a second end portion. A second joint comprises a first bracket. The first bracket comprises an upright protrusion. The protrusion contains a first aperture. The first bracket is coupled to one of the second end portion of the second drawbar and the earth-working tool. A ball joint of the second joint is coupled to the protrusion located within the first aperture. A second bracket defines a channel having laterally spaced first and second sides having the protrusion received between them. The first and second sides of the channel of the second bracket respectively contain second and third apertures. The second bracket is coupled to the other of the second end portion of the second drawbar and the earth-working tool.

A fastener of the first joint comprises a longitudinal axis. The fastener is positioned through the first aperture and the ball joint located therein, the second aperture, and the third aperture. The fastener couples the first bracket to the second bracket of the first joint. The ball joint of the first joint is configured to enable relative pivotal movement between the first bracket and the second bracket of the first joint. A fastener of the second joint comprises a longitudinal axis. The fastener is positioned through the first aperture and the ball joint located therein, the second aperture and the third aperture. The fastener couples the protrusion of the first bracket and the second bracket of the first joint. The ball joint of the second joint is received on the fastener of the second joint and is configured to enable relative pivotal movement between the first and second brackets of the second joint. The protrusion of the first joint is mounted on the fastener of the first joint for lateral movement along the longitudinal axis of the fastener between the first and second sides of the channel, and the protrusion of the second joint is mounted on the fastener of the second joint for lateral movement along the longitudinal axis of the fastener between the first and second sides of the channel of the second joint and the second joint.

In another embodiment, a drawbar apparatus for coupling an earth-working tool to a frame of an agricultural implement is disclosed. The drawbar apparatus comprises a drawbar.

The drawbar comprises a first end portion coupled to the frame and a second end portion containing an aperture.

A joint comprises a bracket defining a channel having first and second laterally spaced sides. The first side of the bracket contains a first aperture and the second side of the bracket contains a second aperture. The bracket is coupled to the earth-working tool. A fastener, having a longitudinal axis, is positioned through the drawbar aperture, the first aperture, and the second aperture. The fastener couples the drawbar to the bracket. The drawbar is mounted on the fastener for movement laterally along the longitudinal axis between the first and second sides of the channel.

BRIEF DESCRIPTION OF THE DRAWINGS

FIG. 8 is a left side perspective view of a rear portion of a drawbar shown coupled directly to a bracket that is coupled to a crossbar of an earth-working tool according to yet another embodiment.

FIG. 9 is a perspective view of a portion of a drawbar, like that of FIG. 8, but showing a different fastener for coupling the bracket directly to the crossbar of the earth-working tool.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
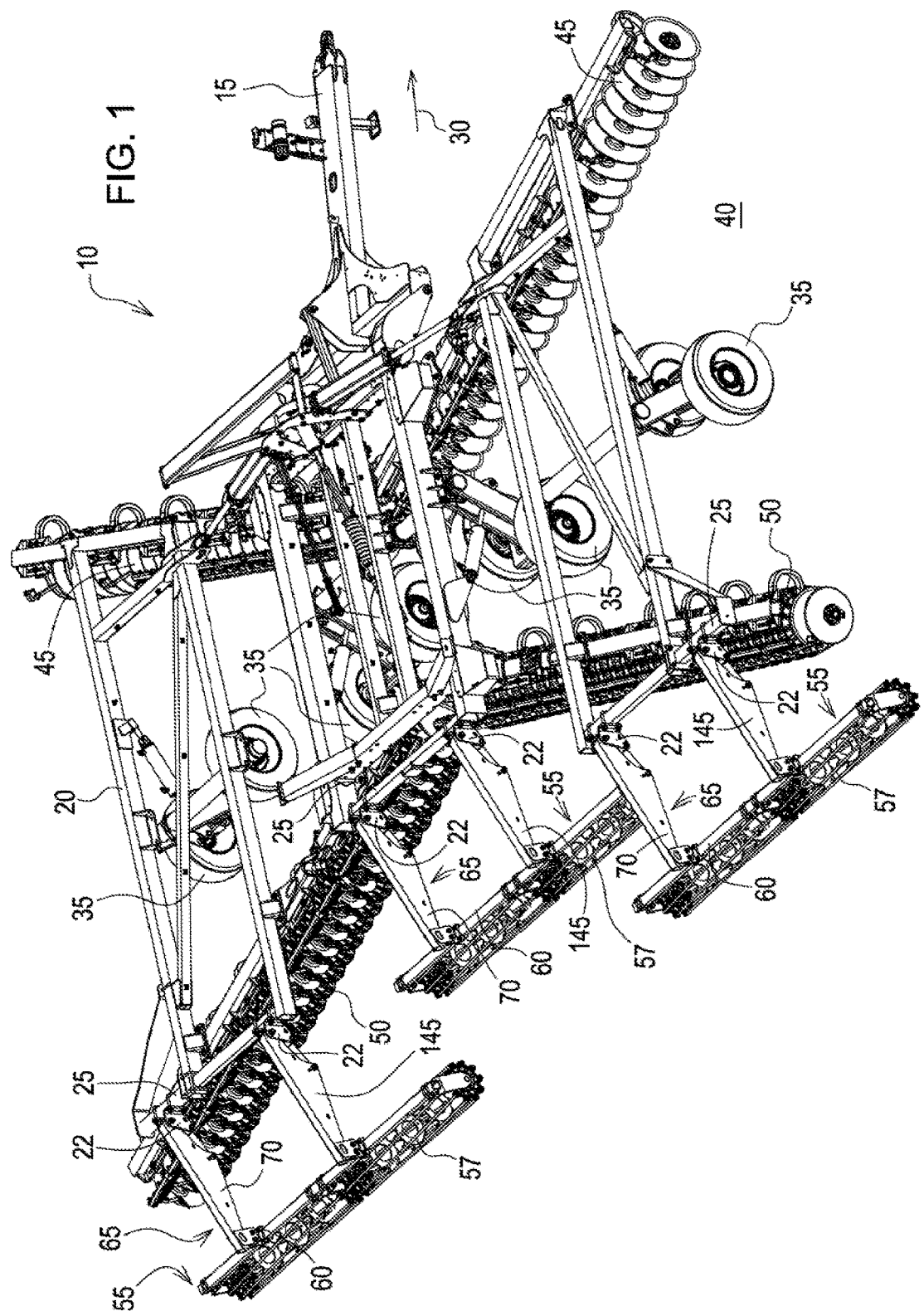
FIG. 1 is a perspective view of an agricultural implement according to one embodiment.

FIG. 1 illustrates an agricultural implement 10. The illustrated agricultural implement 10 comprises a coupling mechanism 15 for coupling to a vehicle (not shown).

A frame 20 comprising a plurality of mounting brackets 22 and a plurality of tool tubes 25 is coupled to the coupling mechanism 15. The frame 20 extends rearwardly from the coupling mechanism 15 in a direction opposite of a direction of travel 30. A plurality of wheel assemblies 35 are coupled to the frame 20. The wheel assemblies 35 support the frame 20 above a surface 40.

A source of hydraulic pressure (not shown) may be coupled to the frame 20. A disk gang assembly 45 and a coulter disk gang assembly 50 may be coupled to the frame 20.

Figure 2:
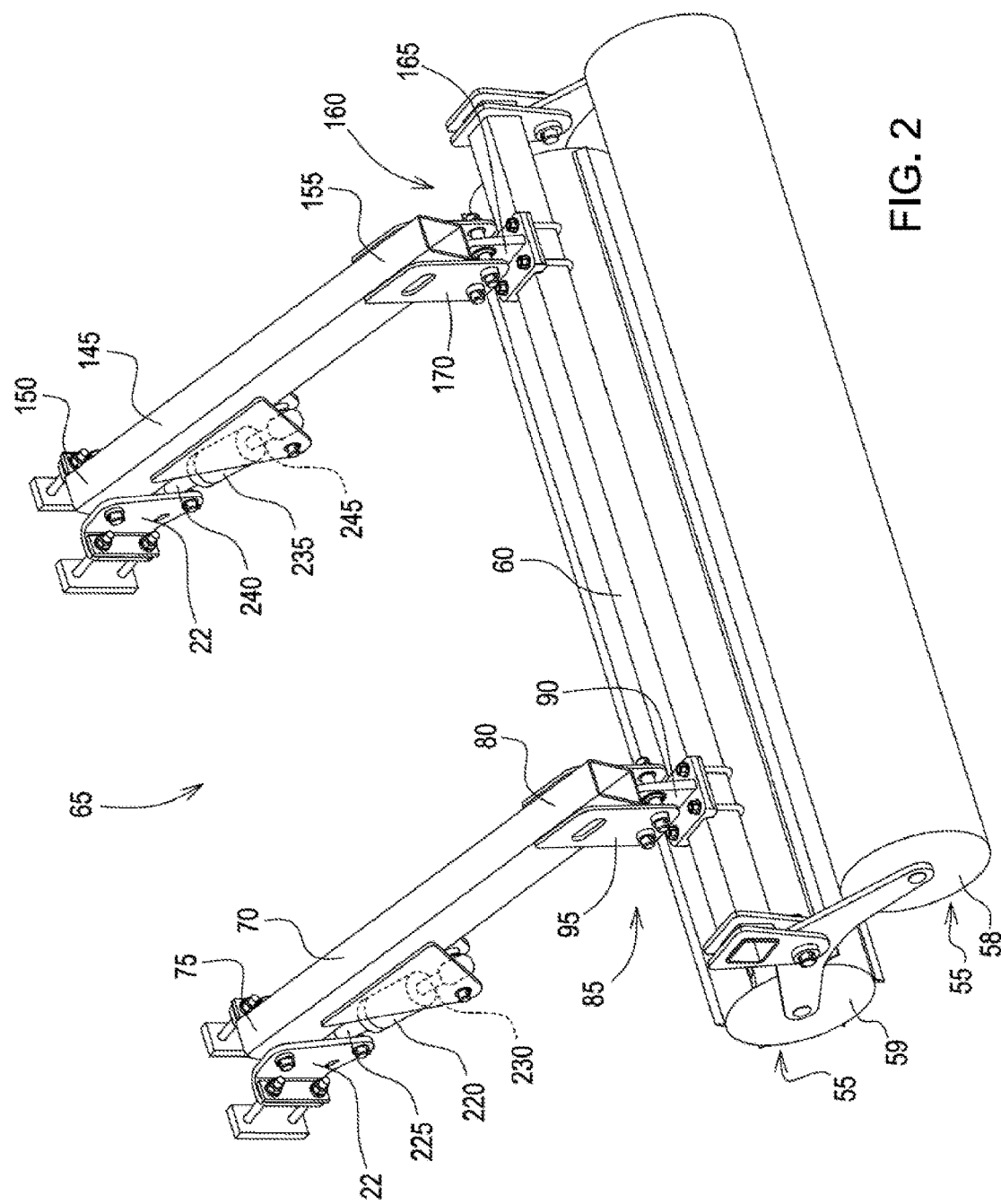
FIG. 2 is a left rear perspective view of one of the drawbar apparatuses of the agricultural implement of FIG. 1 shown coupled to a crossbar of an earth-working tool by a first joint constructed according to one joint embodiment.

The agricultural implement 10 may comprise one or more earth-working tools 55 (e.g., rolling basket, harrow, leveler system). The illustrated earth-working tool 55 is a rolling basket 57. Referring to FIG. 2, the earth-working tool 55 may comprise a first rolling basket 58 and a second rolling basket 59. The earth-working tools 55 may comprise a crossbar 60.

Figure 3:
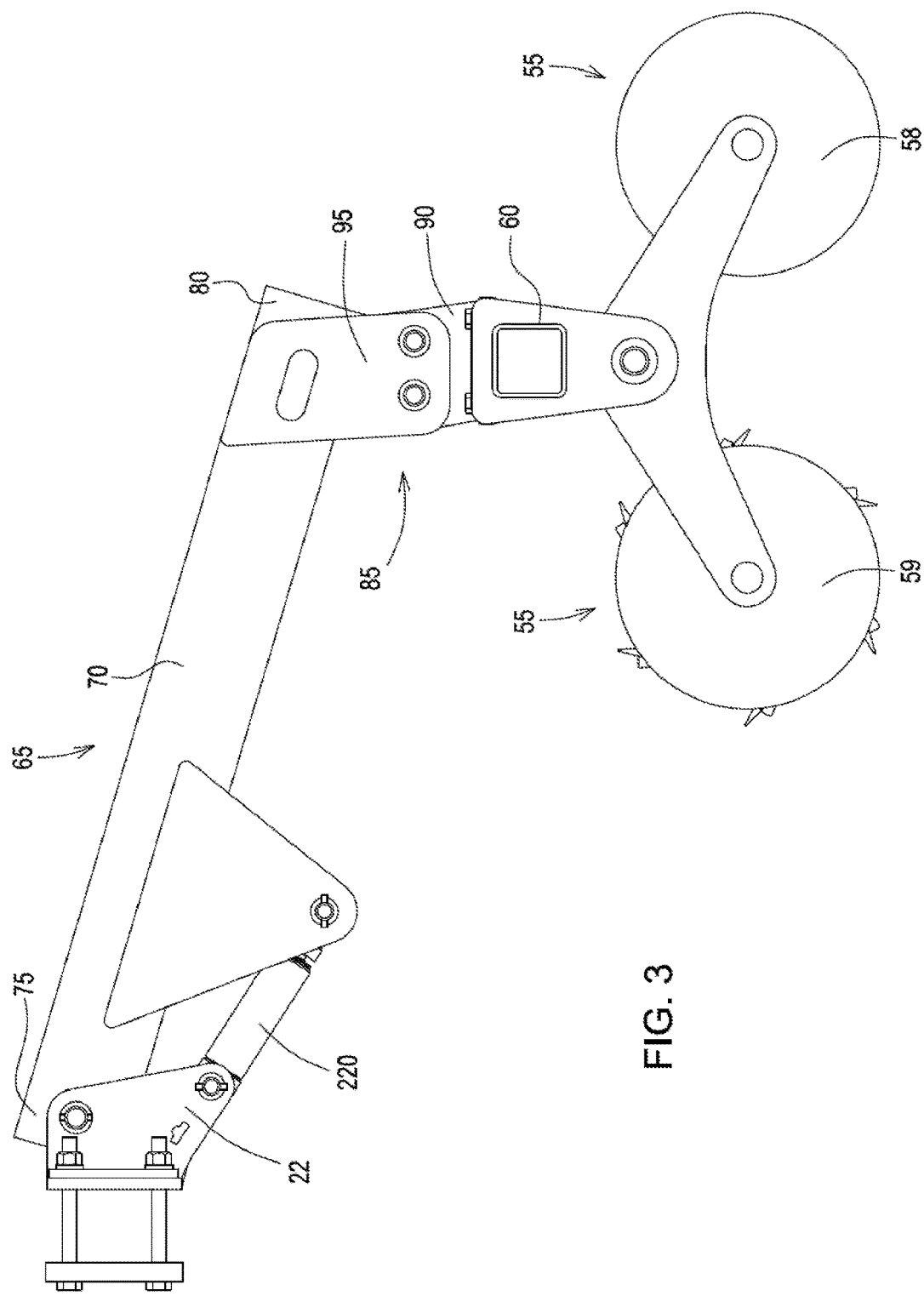
FIG. 3 is a left side view of the drawbar apparatus of FIG. 2.

With reference to FIGS. 1-4, a drawbar apparatus 65 may comprise a first drawbar 70. Referring to FIGS. 2 and 3, the first drawbar 70 may comprise a first end portion 75 and a second end portion 80. The first end portion 75 may be pivotally coupled to the frame 20 (FIG. 1) using the mounting brackets 22. The mounting brackets 22 may form a tight pin joint coupling the drawbar 70 for pivoting vertically relative to the frame 20.

Figure 4:
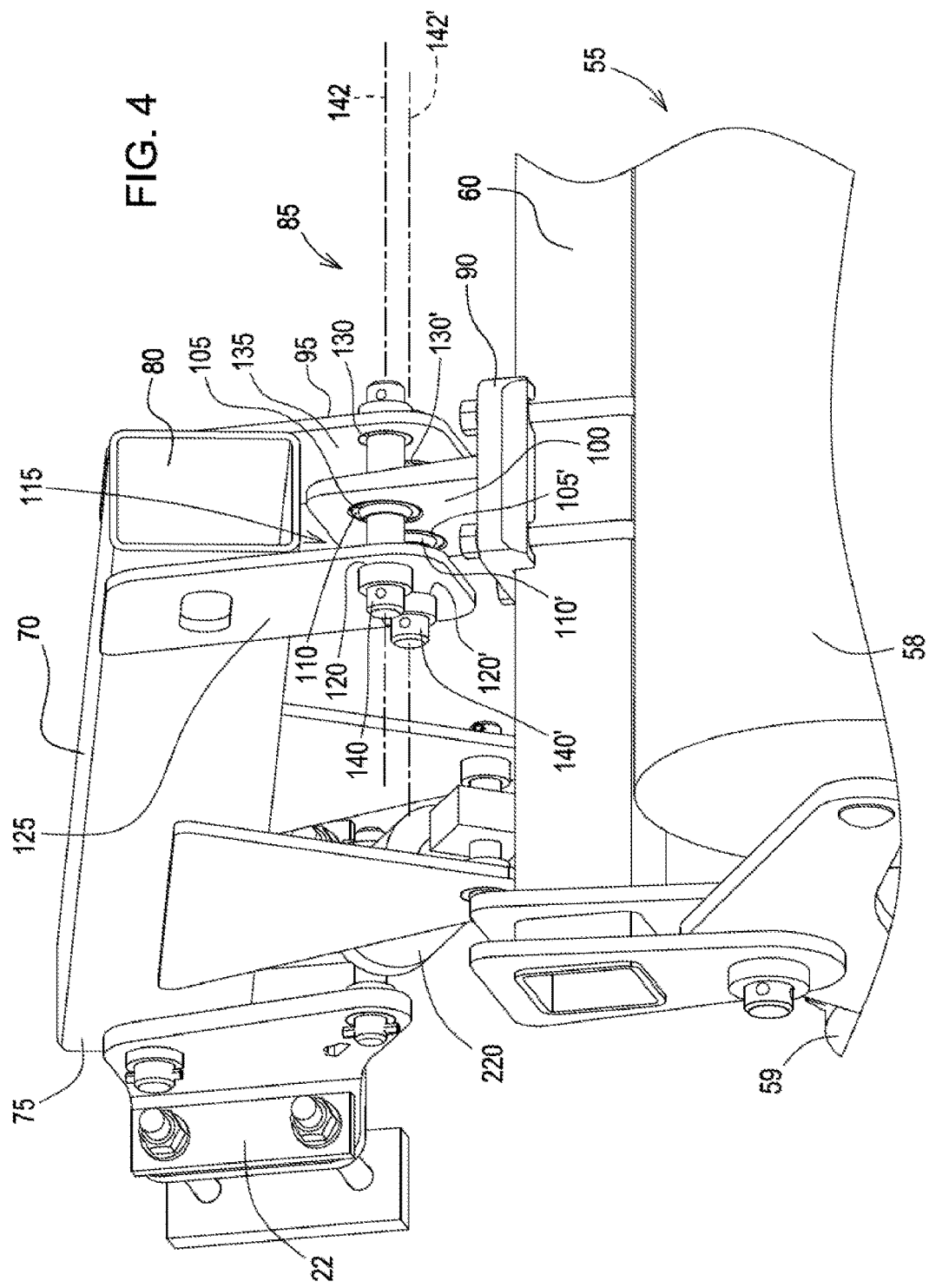
FIG. 4 is an enlarged left rear perspective view of a left side portion of the drawbar apparatus and earth-working tool of FIG. 2.

With reference to FIG. 4, a first joint 85 may comprise a first bracket 90 and a second bracket 95. The first bracket 90 may comprise an upright protrusion 100. The protrusion 100 may contain a first pair of fore-and-aft spaced apertures 105, 105'. The first bracket 90 may be coupled to the crossbar 60. Alternatively, the first bracket 90 may be coupled to the second end portion 80 of the first drawbar 70.

A pair of ball joints 110, 110' may be coupled to the protrusion 100 and respectively located within the first pair of apertures 105, 105'. Alternatively, a pair of simulated ball joints may be used. A pair of bushings may also be used. The bushings defining an enlarged first end and an enlarged second end.

The second bracket 95 may define a channel 115. The channel 115 may be configured to receive the protrusion 100 for shifting laterally therein by including first and second sides 125 and 135 spaced laterally from each other a distance greater than a lateral dimension of the protrusion 100. The second bracket 95 may contain a second pair of fore-and-aft spaced apertures 120, 120', respectively, positioned on a first side 125 of the channel 115. The second bracket 95 may define a third aperture 130, 130' positioned on a second side 135 of the channel 115.

The second bracket 95 may be coupled to the second end portion 80 of the drawbar 70. Alternatively, the second bracket 95 may be coupled to the crossbar 60 of the earth-working tool 55.

A pair of fore-and-aft spaced fasteners 140 and 140' respectively including longitudinal axes 142 and 142' may be respectively positioned through the first pair of apertures 105, 105', the second pair of apertures 120, 120', and the third pair of apertures 130, 130' to pivotally couple the first bracket 90 and the second bracket 95.

With reference to FIGS. 1 and 2, the drawbar apparatus 65 may comprise a second drawbar 145 that is identical to the first drawbar 70. Referring to FIG. 2, the second drawbar 145 may comprise a first end portion 150 and a second end portion 155. The first end portion 150 may be pivotally coupled to the frame 20 (FIG. 1) using the mounting brackets 22. The mounting brackets 22 may form a tight pin joint.

Figure 5:
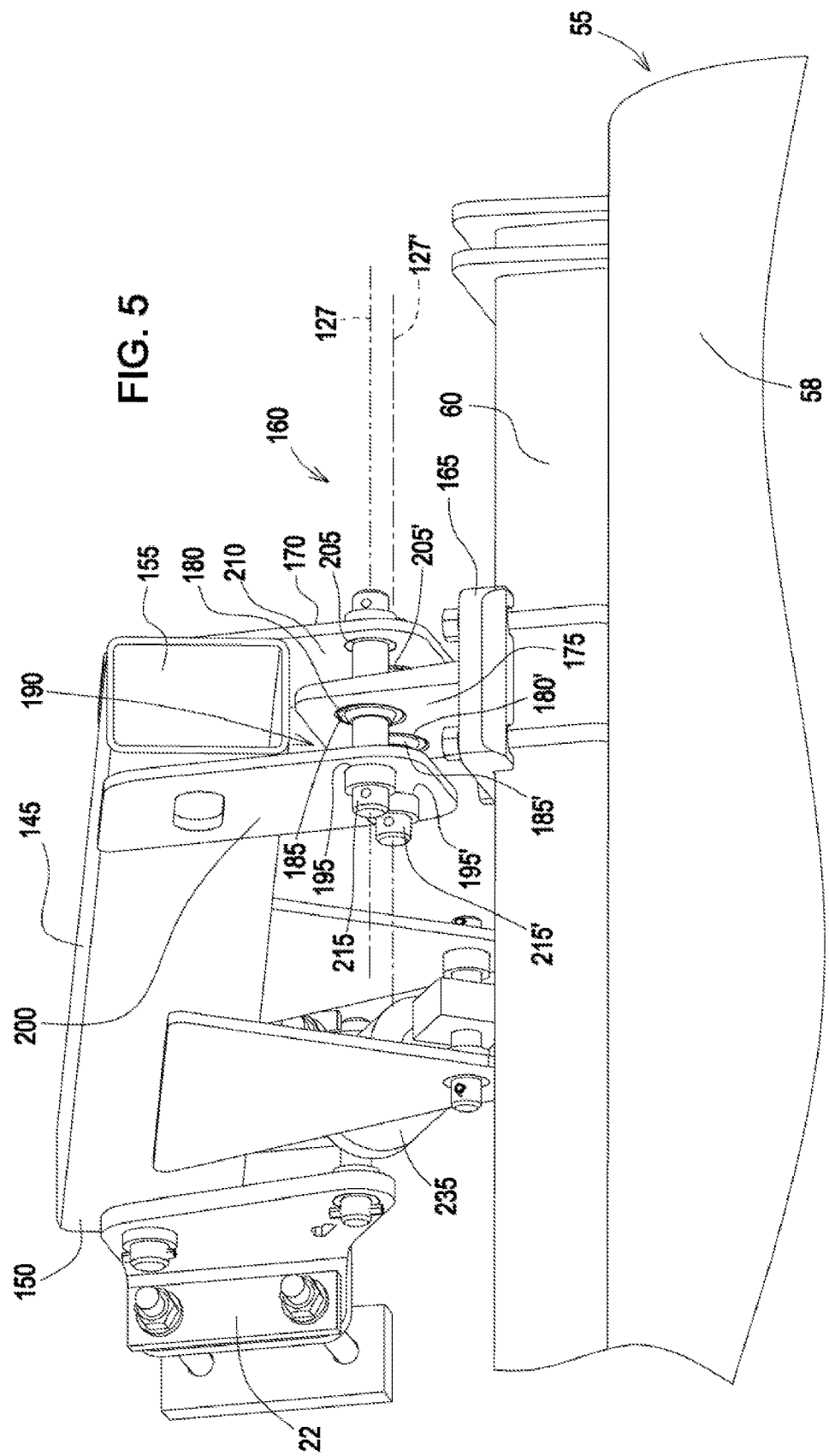
FIG. 5 is an enlarged left rear perspective view, like FIG. 2, but showing a right side portion of the drawbar apparatus.

With reference to FIG. 5, a second joint 160 may comprise a first bracket 165 and a second bracket 170. The first bracket 165 may comprise an upright protrusion 175. The protrusion 175 may contain a first pair of fore-and-aft spaced apertures 180, 180'. The first bracket 165 may be coupled to the crossbar 60. Alternatively, the first bracket 165 may be coupled to the second end portion 155 of the second drawbar 145.

A pair of ball joints 185 and 185' may be coupled to the protrusion 175 and respectively received in the first pair of apertures 180 and 180'. Alternatively, a simulated pair of ball joints may be used. A pair of bushings may also be used. The pair of bushings may define enlarged first ends and enlarged second ends.

The second bracket 170 may define a channel 190. The channel 190 may be configured to receive the protrusion 175 for shifting laterally therein by having first and second upright sides 200 and 210 spaced laterally from each other by a distance greater than a lateral dimension of the protrusion 175. The second bracket 170 may contain a second pair of fore-and-aft spaced apertures 195, 195', respectively, located in the first side 200 of the channel 190. The second bracket 170 may contain a third pair of fore-and-aft spaced apertures 205, 205', respectively, located in the second side 210 of the channel 190.

The second bracket 170 may be coupled to the second portion 155. Alternatively, the second bracket 170 may be coupled to the crossbar 60.

A pair of fore-and-aft spaced fasteners 215 and 215' include respective longitudinal axes 217 and 217' and may be respectively positioned through the first pair of apertures 180, 180', the second pair of apertures 195, 195', and the third pair of apertures 205, 205' to pivotally couple the first bracket 165 and the second bracket 170.

With reference to FIG. 2, a first extendable and retractable hydraulic cylinder 220 comprises a first end 225 pivotally coupled to the mounting brackets 22 of the frame 20. The first hydraulic cylinder 220 comprises a second end 230 pivotally coupled to the first drawbar 70.

A second extendable and retractable hydraulic cylinder 235 comprises a first end 240 pivotally coupled to the mounting brackets 22 of the frame 20. The second hydraulic cylinder 235 comprises a second end 245 pivotally coupled to the second drawbar 145.

The first and second hydraulic cylinders 220, 235 may be double acting. Alternatively, spring-protected linear actuators (not shown) could be used to eliminate the need for the first and second hydraulic cylinders 220, 235.

In operation, the coupling mechanism 15 of the agricultural implement 10 is coupled to the vehicle and pulled in the direction of travel 30. As the agricultural implement 10 encounters terrain changes, the drawbar apparatus 65 helps to keep the earth-working tool 55 following a contour of the surface 40 by allowing the first drawbar 70 and the second drawbar 145 to walk independently. The ball joints 110, 110', 185, 185' of the first and second drawbars 70, 145 are configured to enable relative pivotal movement between the first brackets 90, 165 and the second brackets 95, 170, respectively. This helps the agricultural implement 10 to more closely follow the contour of the surface 40. The protrusions 100, 175 of the first and second joints 85, 160 are configured to move laterally in the channels 115, 190 along the longitudinal axes 142, 142', 127, 127' of the fasteners 140, 140', 215, 215', respectively. This also helps the agricultural implement 10 to more closely follow the contour of the surface 40.

Figure 6:
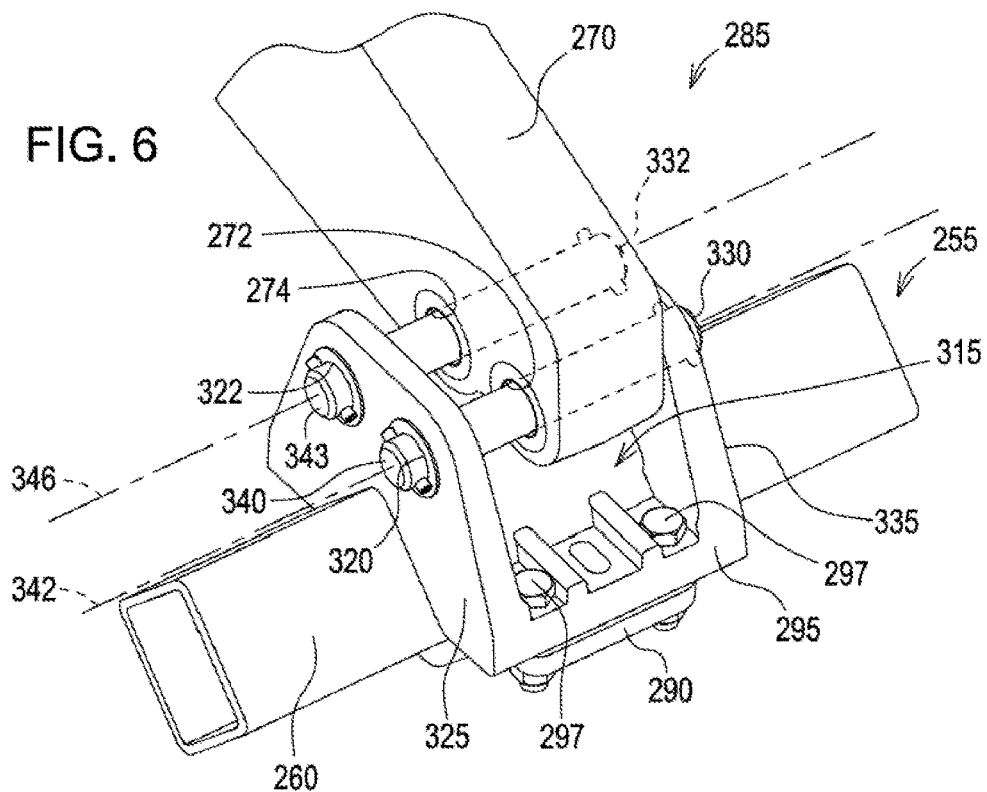
FIG. 6 is a left side perspective view of a rear portion of a drawbar shown coupled directly to a bracket that is coupled to a crossbar of an earth-working tool according to another embodiment.
Figure 7:
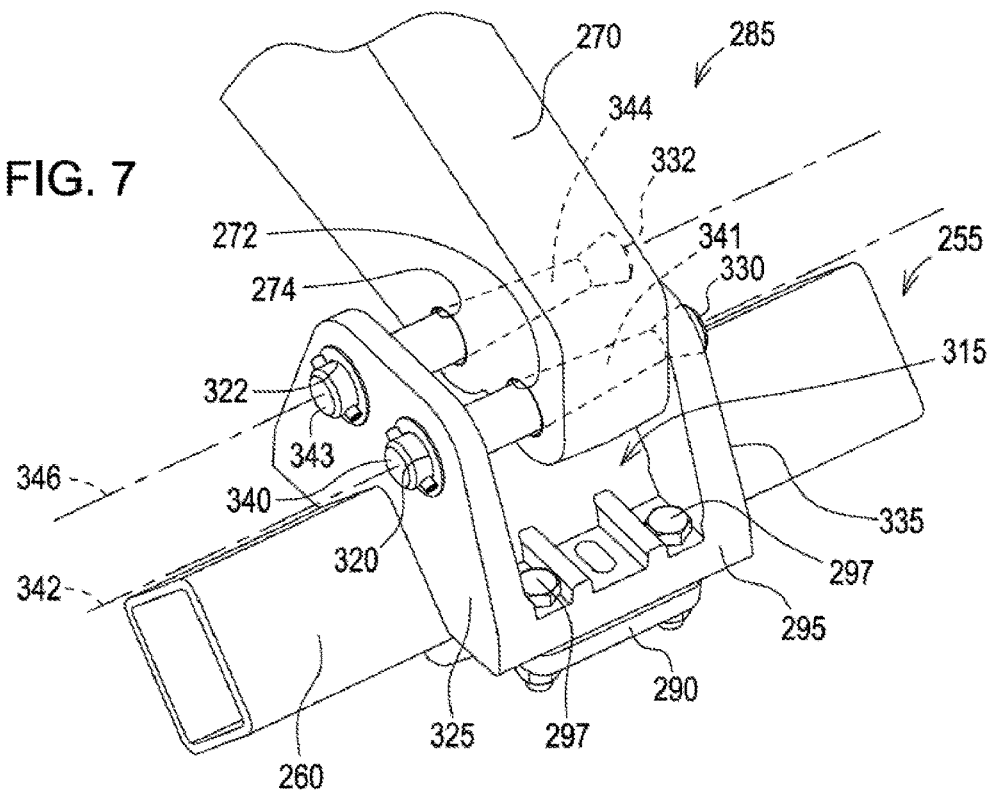
FIG. 7 is a perspective view of a portion of a drawbar, like that of FIG. 6, but showing different fasteners for coupling the bracket directly to the crossbar of the earth-working tool.

FIGS. 6 and 7 illustrate a joint 285 according to another embodiment. The joint 285 includes features similar to the first joint 85 of FIGS. 1-4 and therefore, like components have been given like reference numbers plus 200 and only differences between the joint 285 and the first joint 85 will be discussed in detail below.

The joint 285 may comprise a first bracket 290 and a second bracket 295. The first bracket 290 may couple the second bracket 295 to a crossbar 260 of an earth-working tool 255 using a plurality of fasteners 297, noting that the crossbar 260 is rotated 90 degrees relative to the crossbar 60 of the first joint 85, with the brackets 290 and 295 being shaped to conform to angled top and bottom profiles of the crossbar 260. Alternatively, the second bracket 295 may be coupled directly to the crossbar 260 without the need for the first bracket 290.

The second bracket 295 may define a channel 315 having laterally spaced upright sides 325 and 335, and a rear end portion of a drawbar 270 is received between the sides 325 and 335. The drawbar 270 may contain a first drawbar aperture 272 and a second drawbar aperture 274. The second bracket 295 may include a third aperture 320 and a fourth aperture 322 contained in the first side 325 of the channel 315. The second bracket 295 may include a fifth aperture 330 and a sixth aperture 332 contained in the second side 335 of the channel 315.

A first fastener 340, shown as a cylindrical pin in FIG. 6, and comprising a longitudinal axis 342 may be positioned through the third aperture 320 in the first channel side 325, the first drawbar aperture 272, and the fifth aperture 330 in the second channel side 335 to pivotally couple the drawbar 270 to the second bracket 295. The first fastener 340 may comprise a taper 341 (FIG. 7) providing a clearance that allows relative movement between the drawbar 270 and the second bracket 295.

A second fastener 343, shown as a cylindrical pin in FIG. 6, and comprising a longitudinal axis 346 may be positioned through the fourth aperture 322 in the first channel side 325, the second drawbar aperture 274, and the sixth aperture 332 in the second channel side 335 to pivotally couple the drawbar 270 to the second bracket 295. The second fastener 343 may comprise a taper 344 (FIG. 7) providing a clearance that allows relative movement between the drawbar 270 and the second bracket 295.

FIGS. 8 and 9 illustrate a joint 485 according to another embodiment. The joint 485 includes features similar to the first joint 85 of FIGS. 1-4 and therefore, like components have been given like reference numbers plus 400 and only differences between the joint 485 and the first joint 85 will be discussed in detail below.

The joint 485 may comprise a first bracket 490 and a second bracket 495. The first bracket 490 may couple the second bracket 495 to a crossbar 460 of an earth-working tool 455 using a plurality of fasteners 497, noting that the crossbar 460 is rotated 90 degrees relative to the crossbar 60 of the first joint 85, with the brackets 490 and 495 being shaped to conform to angled top and bottom profiles of the crossbar 460. Alternatively, the second bracket 495 may be coupled directly to the crossbar 460 without the need for the first bracket 490.

The second bracket 495 may define a channel 515 having laterally spaced first and second sides 525 and 535, with a rear end portion of a drawbar 470 being received between the sides 525 and 535. The drawbar 470 may contain a drawbar aperture 472. The second bracket 495 may contain a first aperture 520 positioned on a first side 525 of the channel 515. The second bracket 495 may contain a second aperture 530 positioned on a second side 535 of the channel 515.

A fastener 540, shown in FIG. 8 as being a cylindrical pin and comprising a longitudinal axis 542 may be positioned through the first aperture 520 contained in the first channel side 525, the drawbar aperture 472, and the second aperture 530 contained in the second channel side 535 to pivotally couple the drawbar 470 and the second bracket 495. The fastener 540 may comprise a taper 541 (FIG. 9) providing a clearance that allows relative movement between the drawbar 470 and the second bracket 495.

At least one stop 543 may be coupled to, or formed into, the second bracket 495. FIGS. 8 and 9, for example, show the bracket 495 as including upright, front and rear end walls 544 and 546 extending transversely between, and joining, the first and second sides 525 and 535 of the channel 515. The stop 543 is defined by a horizontal upper surface of the rear end wall 546 that is located for being engaged by a bottom surface 548 of a rear end region of the drawbar 470 which extends over the rear end wall 546, noting that the drawbar 470 includes a downward bulged portion 550 received in the channel 515 between the first and second sides 525 and 535. Thus, the stop 543 is configured to limit the pivotal orientation of the crossbar 460 about the axis 542 relative to the drawbar 470.

Figure 11:
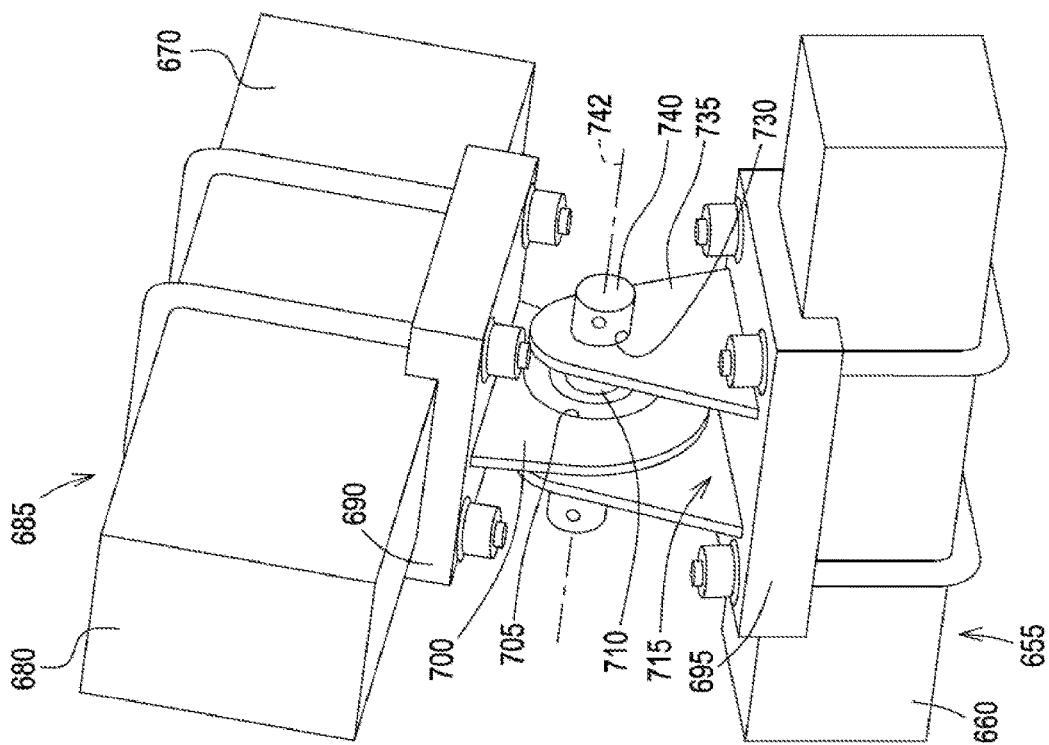
FIG. 11 is a right rear perspective view of the joint shown in FIG. 10.
Figure 10:
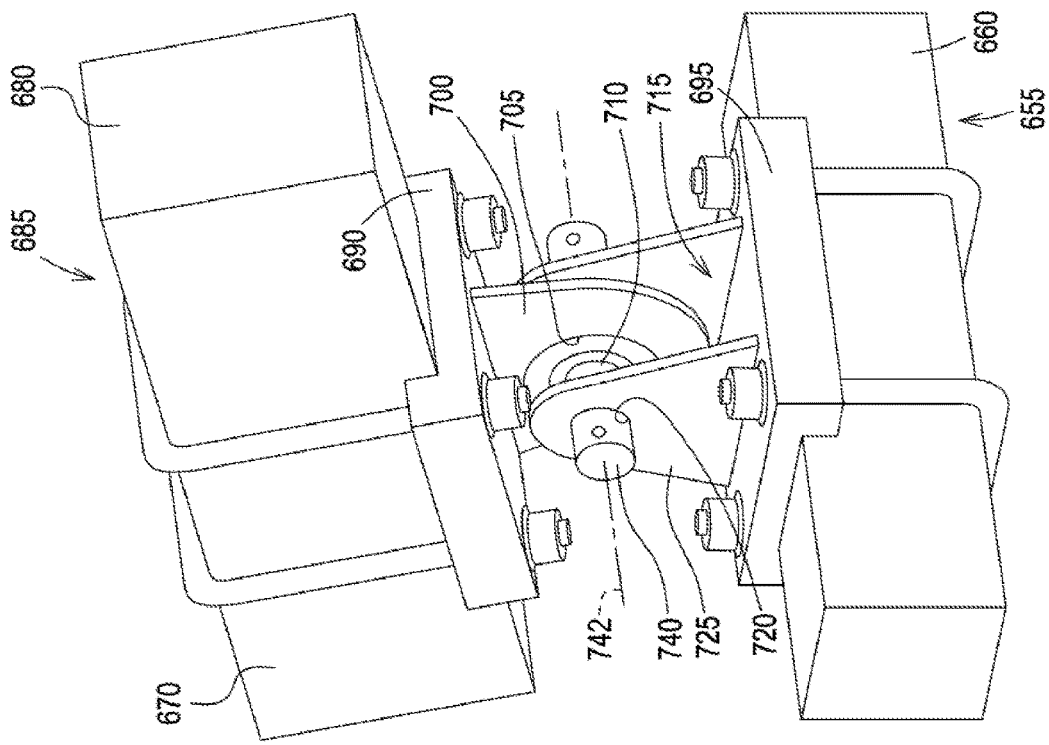
FIG. 10 is a left rear perspective view of a rear end portion of one drawbar coupled to an earth-working tool at a joint constructed according to a further embodiment including a first bracket coupled to the drawbar and a second bracket coupled to a crossbar of the earth-working tool.

FIGS. 10 and 11 illustrate a joint 685 according to another embodiment. The joint 685 includes features similar to the first joint 85 of FIGS. 1-4 and therefore, like components have been given like reference numbers plus 600 and only differences between the joint 685 and the first joint 85 will be discussed in detail below.

The first joint 685 may comprise a first bracket 690 and a second bracket 695. The first bracket 690 may comprise a protrusion 700. The protrusion 700 may contain a first aperture 705. The first bracket 690 may be coupled to a crossbar 660 of an earth-working tool 655. Alternatively, the first bracket 690 may be coupled to a second end portion 680 of a drawbar 670.

A ball joint 710 may be received in the first aperture 705. Alternatively, a simulated ball joint may be used. A bushing may also be used. The bushing may define an enlarged first end and an enlarged second end.

The second bracket 695 may define a channel 715. The channel 715 may include laterally spaced, upright, first and second sides 725, 735 and thus be configured to receive the protrusion 700. The second bracket 695 may include a second aperture 720 contained in the first side 725 of the channel 715. The second bracket 695 may include a third aperture 730 contained in the second side 735 of the channel 715.

The second bracket 695 may be coupled to the second end portion 680 of the drawbar 670. Alternatively, the second bracket 695 may be coupled to the crossbar 660.

A fastener 740 comprising a longitudinal axis 742 may be positioned through the first aperture 705, the second aperture 720, and the third aperture 730 to pivotally couple the first bracket 690 and the second bracket 695.

Various features are set forth in the following claims.

What is claimed is:

1. A drawbar apparatus for coupling an earth-working tool to a frame of an agricultural implement, the drawbar apparatus comprising:
   at least one drawbar comprising a first end portion coupled to the frame and a second end portion;
   at least one joint comprising a first bracket comprising a protrusion, the protrusion defining at least a first aperture, the first bracket coupled to one of the second end portion of the drawbar and the earth-working tool, a second bracket defining a channel configured to receive the protrusion and defining at least a second aperture on a first side of the channel and at least a third aperture on a second side of the channel, the second bracket being coupled to the other of the second end portion of the drawbar and the earth-working tool, and a fastener comprising a longitudinal axis, the fastener being positioned through the first aperture, the second aperture, and the third aperture, the fastener coupling the first bracket to the second bracket; and
   an extendable and retractable hydraulic cylinder comprising a first end coupled to the frame and a second end coupled to the at least one drawbar;
   wherein the protrusion of the joint has a lateral dimension less than a lateral distance between the first and second sides of the channel and is configured to move laterally in the channel along the longitudinal axis of the fastener.

2. The drawbar apparatus of claim 1, further comprising a ball joint mounted to the protrusion and located within the first aperture, the ball joint configured to enable relative pivotal movement between the first bracket and the second bracket.

3. The drawbar apparatus of claim 1, wherein a fourth aperture is provided in the protrusion in fore-and-aft spaced relationship to the at least one aperture, a fifth aperture is provided in the first side of the channel in fore-and-aft spaced relationship to the second aperture, and a sixth aperture is provided in the second side of the channel in fore-and-aft spaced relationship to the third aperture, and wherein a second fastener having a second longitudinal axis is received in the fourth, fifth and sixth apertures so as to act in concert with the first-mentioned fastener for connection the first and second brackets together, with the earth-working tool being mounted for shifting laterally along the first-mentioned and second longitudinal axes of each of the first-mentioned fastener and second fastener during operation of the drawbar apparatus.

4. The drawbar apparatus of claim 1, wherein the earth-working tool comprises a rolling basket.

5. A drawbar apparatus for coupling an earth-working tool to a frame of an agricultural implement, the drawbar apparatus comprising:
   a first drawbar comprising a first end portion pivotally coupled to the frame and a second end portion;
   a first joint comprising a first bracket comprising a protrusion, the protrusion defining at least a first aperture, the first bracket being coupled to one of the second end portion of the first drawbar and the earth-working tool, a ball joint coupled to the protrusion and being located within the first aperture, a second bracket defining a channel configured to receive the protrusion and defining at least a second aperture on a first side of the channel and at least a third aperture on a second side of the channel, the second bracket being coupled to the other of the second end portion of the first drawbar and the earth-working tool;
   a first fastener comprising a longitudinal axis, the fastener being positioned through the first aperture, the second aperture, and the third aperture, and thereby coupling the first bracket to the second bracket;
   a second drawbar comprising a first end portion pivotally coupled to the frame and a second end portion; and
   a second joint comprising a first bracket including a protrusion, the protrusion containing at least a first aperture, the first bracket being coupled to one of the second end portion of the second drawbar and the earth-working tool, a ball joint coupled to the protrusion and being received within the first aperture, a second bracket defining a channel configured to receive the protrusion by containing a second aperture within a first side of the channel and by containing a third aperture within a second side of the channel, the second bracket being coupled to the other of the second end portion of the second drawbar and the earth-working tool, and a second fastener comprising a longitudinal axis, the second fastener being positioned through the first aperture, the second aperture, and the third aperture of the second joint and thereby coupling the first bracket of the second joint to the second bracket of the second joint;
   wherein the ball joints of the first joint and the second joint are configured to enable relative pivotal movement between the first bracket and the second bracket in response to relative pivotal movement of the first drawbar and the second drawbar.

6. The drawbar apparatus of claim 5, wherein respective lateral dimensions between the first and second sides of the channel of the first joint and between the first and second sides of the channel of the second joint are respectively greater than lateral dimensions of the protrusions of the first joint and the second joint to the extent that the protrusions are configured to move laterally between the first and second sides of the channels along the longitudinal axes of the first and second fasteners respectively of the first and second joints.

7. The drawbar apparatus of claim 5, further comprising a first extendable and retractable hydraulic cylinder comprising a first end coupled to the frame and a second end coupled to the first drawbar.

8. The drawbar apparatus of claim 7, further comprising a second extendable and retractable hydraulic cylinder comprising a first end coupled to the frame and a second end coupled to the second drawbar.

9. The drawbar apparatus of claim 5, wherein the earth-working tool comprises a rolling basket.

10. An agricultural implement comprising:
   a coupling mechanism for coupling to a vehicle;
   a frame coupled to the coupling mechanism and extending from the coupling mechanism and adapted to be pulled by the vehicle;
   a plurality of wheel assemblies coupled to the frame, the wheel assemblies supporting the frame above a surface;
   an earth-working tool; and
   a drawbar apparatus for coupling the earth-working tool to the frame, the drawbar apparatus comprising a first drawbar comprising a first end portion coupled to the frame and a second end portion, a first joint having a first bracket including a protrusion, the protrusion containing a first aperture, the first bracket being coupled to one of the second end portion of the first drawbar and the earth-working tool, a ball joint coupled to the protrusion and being located within the first aperture, a second bracket defining a channel configured to receive the protrusion by containing a second aperture within a first side of the channel and containing a third aperture within a second side of the channel, the second bracket being coupled to another of the second end portion of the first drawbar and the earth-working tool, and a fastener comprising a longitudinal axis, the fastener being positioned through the first aperture, the second aperture, and the third aperture, the fastener coupling the first bracket of the first joint to the second bracket of the first joint, a second drawbar comprising a first end portion coupled to the frame and a second end portion, and a second joint comprising a first bracket including a protrusion, the protrusion containing a first aperture, the first bracket being coupled to one of the second end portion of the second drawbar and the earth-working tool, a ball joint coupled to the protrusion of the second joint and located within the first aperture, a second bracket defining a channel configured to receive the protrusion of the second joint and containing a second aperture within a first side of the channel and containing a third aperture within a second side of the channel, the second bracket being coupled to another of the second end portion of the second drawbar and the earth-working tool, and at least a second fastener comprising a longitudinal axis, the second fastener being positioned through the first aperture, the second aperture, and the third aperture, the second fastener coupling the first bracket of the second joint to the second bracket of the second joint;
   wherein the ball joints of the first joint and the second joint are configured to enable relative pivotal movement between the first bracket and the second bracket, and the protrusions of each of the first joint and the second joint have a lateral dimension less than a lateral distance respectively between the first and second walls of the respective channels of the first and second joints and are thus configured to move laterally in the channels along the longitudinal axes of the first and second fasteners.

11. The agricultural implement of claim 10, further comprising a first extendable and retractable hydraulic cylinder including a first end coupled to the frame and a second end coupled to the first drawbar.

12. The agricultural implement of claim 11, further comprising a second extendable and retractable hydraulic cylinder having a first end coupled to the frame and a second end coupled to the second drawbar.

13. The agricultural implement of claim 10, wherein the earth-working tool comprises a first rolling basket and a second rolling basket.

14. The agricultural implement of claim 10, wherein the earth-working tool comprises a rolling basket.

15. The agricultural implement of claim 10, further comprising a coulter disk gang assembly coupled to the frame.

16. The agricultural implement of claim 10, further comprising a disk gang assembly coupled to the frame.

* * * * *